United States Patent [19]

Yuasa et al.

[11] Patent Number: 4,531,830
[45] Date of Patent: Jul. 30, 1985

[54] AUTOMATIC FOCUSING DEVICE FOR AN ENLARGER

[75] Inventors: Yoshio Yuasa, Osaka; Nobukazu Kawagoe, Sakai; Hidetoshi Yasumoto, Tondabayashi, all of Japan

[73] Assignee: Minolta Camera Kabushiki Kaisha, Osaka, Japan

[21] Appl. No.: 532,719

[22] Filed: Sep. 14, 1983

[30] Foreign Application Priority Data

Sep. 16, 1982 [JP] Japan ............................ 57-161755

[51] Int. Cl.³ ...................... G03B 27/34; G03B 27/40
[52] U.S. Cl. ...................................................... 355/56
[58] Field of Search .................................... 355/56, 59

[56] References Cited

U.S. PATENT DOCUMENTS

| 3,735,686 | 5/1973 | Brewer et al. ............ 355/56 X |
| 3,832,058 | 8/1974 | Gusovius .................... 355/56 |
| 4,021,115 | 5/1977 | Jeppesen ..................... 355/56 |
| 4,313,676 | 2/1982 | Nygaard ...................... 355/56 |
| 4,488,804 | 12/1984 | Takagi ......................... 355/56 |

Primary Examiner—Richard A. Wintercorn
Attorney, Agent, or Firm—Joseph W. Price

[57] ABSTRACT

An improved enlarger for producing prints from an image bearing negative includes a film carrier, an enlarging lens, a light source, and a supporting pole for moving the elements to different operative positions. The apparatus is provided for inputting a signal representative of the focal length, and detectors are provided for determining a first and second datum position with the enlarging lens focused at each position. The information representative of these positions can then be used to automatically provide an in-focus position for the enlarging lens at a desired magnification level when the film carrier is subsequently moved.

8 Claims, 2 Drawing Figures

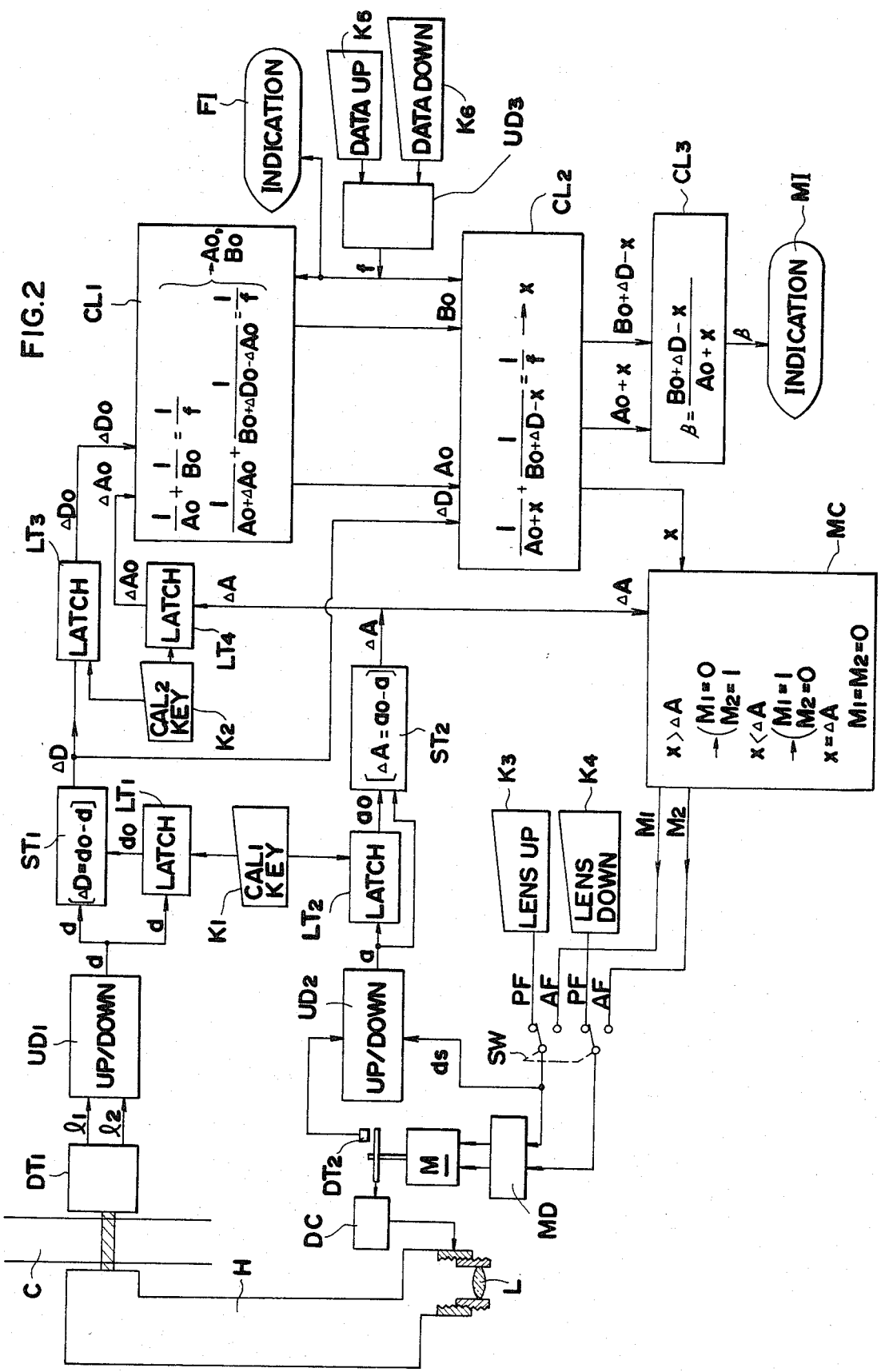

AUTOMATIC FOCUSING DEVICE FOR AN ENLARGER

BACKGROUND OF THE INVENTION

1. Field of the Invention

The invention relates to an automatic focusing device for a photographic enlarger and more particularly to such an automatic focusing device wherein, once an enlarging lens has been set manually to its infocus condition, the enlarging lens is automatically shifted to its in-focus position in response to a change in distance between the light source head and the easel plane or the plane of the printing paper.

2. Description of the Prior Art

Heretofore, various devices of the above mentioned type have been known. One of them is shown in Japanese laid-open patent application No. 57-100415. With the device of the Japanese laid-open patent application, after the distance between a film and an easel on which a printing paper is placed is determined to provide an appropriate enlarging magnification and the focusing of the enlarging lens is manually adjusted, the distance from the film to the enlarging lens is calculated and memorized in accordance with the distance between the film and the easel and the focal length of the enlarging lens. Thus, an initial position setting is completed. When the distance between the film and the easel is changed for changing the enlarging magnification after the completion of such an initial position setting, the device calculates a new film enlarging-lens distance, from the amount of the change of the film-to-easel distance and the distance relating to the aforementioned initial position. Then, the device shifts the enlarging lens to a position commensurate with the calculated distance.

However, the known device has a disadvantage in that the distance between the film and the printing paper (the easel) can not be known and the focusing can not be adjusted automatically in the case where the easel is removed and the printing paper is placed on the floor for large magnification enlarging. This is because the new position of the enlarging lens is determined in accordance with the amount of the change of the film-to-easel distance.

SUMMARY OF THE INVENTION

The object of the present invention is to provide an automatic focusing device for a photographic enlarger which can shift the enlarging lens automatically to its in-focus position in response to a subsequent change in the distance between the film and the printing paper without requiring information on the distance between the film and the printing paper when the initial position setting is completed.

BRIEF DESCRIPTION OF THE DRAWINGS

FIG. 2 is a block diagram showing an embodiment of the present invention.

DETAILED DESCRIPTION OF THE PREFERRED EMBODIMENT

Figure 1:
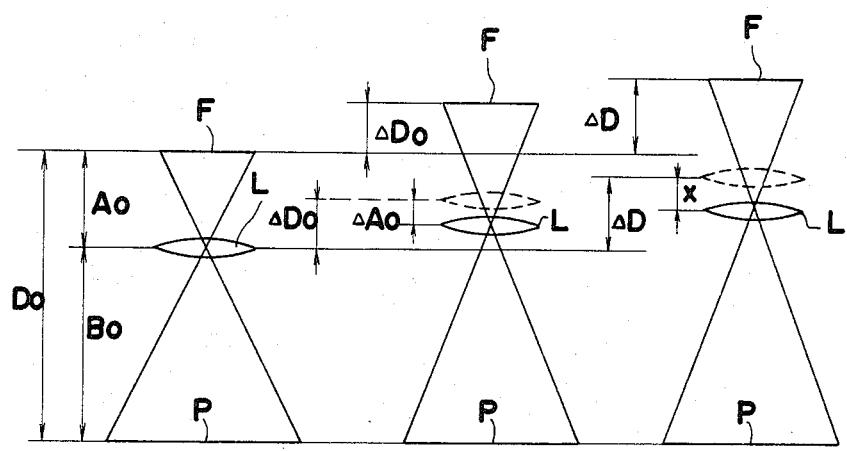
FIG. 1 is a schematic figure showing an optical system of an enlarger for an explanation of the principal of the present invention.

The principal of the present invention will now be explained. With the present invention, the distance between the film and the printing paper is initially determined to an arbitrary value or first datum position and the focusing is manually adjusted to bring the enlarging lens into its in-focus position. At this time, the device according to the invention stores the data on the position of the light source head including the film and the position of the enlarging lens. It should be noticed that a film carrier provided for carrying the film, a light source and the enlarging lens are included in the light source head to be movable integrally, and that the enlarging lens is movable relative to said light source head. Then, the light source head may be shifted and set to a second arbitrary position or second datum position whereupon the focusing is manually adjusted again and the data on the positions of the light source head and the enlarging lens at the second in-focus position are detected. Then, the respective differences of the positions of the light source head and the enlarging lens at the initial and the second in-focus condition are calculated.

Now, as shown in FIG. 1, let Ao represent the distance between a negative film F and an enlarging lens L at the initial in-focus condition. Let Bo represent the distance from the enlarging lens L to a printing paper P, and f represent the focal length of the enlarging lens L. From the Gaussian formula of the thin lens equation, the following relationship will be obtained:

$$\frac{1}{Ao} + \frac{1}{Bo} = \frac{1}{f} \quad (1)$$

If $\Delta Do$ and $\Delta Ao$ are assumed to represent the amount of shift of the light source head and the enlarging lens from their initial to second in-focus positions, $\Delta Do$ may be regarded as showing the amount of change in the distance between the negative film F and the printing paper P since the negative film F is held by a film carrier included in the light source head. Accordingly, the following relationship is given from the lens equation:

$$\frac{1}{Ao + \Delta Ao} + \frac{1}{Bo + \Delta Do - \Delta Ao} = \frac{1}{f} \quad (2)$$

It should be understood that the enlarging lens L is shifted relatively to the film F after being shifted integrally with the latter. As the focal length f of the enlarging lens L has been known previously, and the amount of the shifting Do and $\Delta Ao$ of the light source head and the enlarging lens have been actually calculated, and the value-unknown factors in the equations (1) and (2) are only Ao and Bo which can be determined by resolving the simultaneous equations (1) and (2).

Then, if the light source head is shifted to a desired position and the amount $\Delta D$ of the shifting of the head from its initial to the last position is detected, the amount X of shifting the enlarging lens L from the second in-focus position to the final focus position for the new position of the light source head can be obtained by calculation of the following equation:

$$\frac{1}{Ao + X} + \frac{1}{Bo + \Delta D - X} = \frac{1}{f} \quad (3)$$

Accordingly, the enlarging lens is brought into its in-focus position if it is shifted in accordance with the calculated value X.

FIG. 2 schematically shows an embodiment of the present invention. In the actual device, most of the signal processing and calculating operations are performed by a microprocessor. In the Figure, a light source head H includes a light source, a film carrier for carrying original film such as a negative or positive film, an enlarging lens L and so on. The light source head H is supported on a supporting Pole C to slide vertically therealong. A shift detecting section DT1 which detects the direction and amount of shifting of the light source head H includes, for example, a plurality of magnetic pieces fixed on the supporting pole C at equal intervals longitudinally along pole C, and four Hall elements arranged in a lozenge shape on the light source head. The detecting section DT1 produces at lines l1 and l2 a signal indicating the direction of the movement of the light source head H i.e. whether the head moves upward or downward, and pulse signals of a number proportional to the amount of movement of the same, e.g. one pulse per 1 mm of movement. An up/down counter UD1 receives the pulse signals from the shift detecting section DT1 to count up the number of the received pulses with the light source head H moving downwards and to count down the received pulse number with the head H moving upwards. The up/down counter UD1 produces a signal representative of the counted number. Latch circuit LT1 latches and holds the output of the up/down counter UD1 in response to the operation of a key K1. A subtractor ST1 calculates the difference between the data held in the latch circuit LT1 and the output data of the up/down counter UD1 that changes with the shifting of the light source head. The subtractor ST1 produces an output signal ΔD commensurate with the calculated difference.

A motor M shifts the enlarging lens L upwards or downwards through a reduction mechanism DC. A detector DT2 is composed of, for example, a photocoupler in which the light path is intermittently interrupted by a disk driven by the motor M, and produces pulses of a number proportional to the amount of rotation of the motor, the number of the pulses being counted by an up/down counter UD2. Selector switch SW is switchable between a power focus terminal PF for shifting the enlarging lens L by means of the motor, in response to the manual operation of a lens-up key K3 or a lens-down key K4, and an automatic focusing terminal AF for controlling the motor M in accordance with the later-to-be described automatic control signal for shifting the enlarging lens L. When the lens-up key K3 is operated in a condition where the selector switch SW is connected with the power focus terminal PF, the enlarging lens L is shifted upward and at the same time, a signal dS for indicating the rotational direction of the motor M is inputted to the up/down counter UD2 so that the up/down counter UD2 counts up in response to the pulse signals from the detector DT2. On the other hand, when the lens-down key K4 is operated in a condition where the selector switch SW is connected with the power focus terminal PF, the enlarging lens L is shifted downward by the motor M and the up/down counter UD2 counts down in response to the pulse signals from the detector DT2 since the input dS for indicating the rotational direction of the motor is not inputted to the counter UD2.

A latch circuit LT2 latches and holds the output data a of the up/down counter UD2 when key K1 is operated. A subtractor ST2 calculates the difference between the data $a_o$ held in the latch circuit LT2 and the output data a of the up/down counter UD2 that changes with the upward or downward movement of the enlarging lens L. The subtractor ST2 produces a signal ΔA commensurate with the calculated difference.

Up/down counter UD3 counts up by one per each depression of a data-up key K5 and counts down by one per each depression of a data-down key K6 so that a data f of the focal length of the enlarging lens L is set in accordance with the operation of the keys K5 and K6. Indicator FI indicates a focal length commensurate with the set data, this data also is send to a first and second calculating section CL1 and CL2.

Latch circuits LT3 and LT4 respectively latch and hold the output data ΔD and ΔA generated by the subtractors ST1 and ST2 at the time when the key K2 is operated. The first calculating circuit CL1 receives as its inputs the output data $ΔD_o$ and $ΔA_o$ of the latch circuits LT3 and LT4 and the output data f of the up/down counter UD3, and resolves the aforementioned simultaneous equations (1) and (2) to obtain the values of Ao and Bo, and then supplies the data commensurate with the calculated values to the second calculation circuit CL2. The second calculation circuit CL2 performs a calculation to obtain the data X from its input data of ΔD, Ao, Bo and f in accordance with the above-mentioned formula (3), and supplies the calculated data X to a motor control circuit MC. A third calculation circuit CL3 calculates the value of the magnification β based on the below equation (4) from the data Ao+X and Bo+ΔD−X sent from the second calculation circuit CL2 and an indicating circuit M1 indicates the value β of the magnification in accordance with the output of the third calculation circuit CL3.

$$\beta = \frac{Bo + \Delta D - x}{Ao + X} \quad (4)$$

The motor control circuit MC compares the output signal data ΔA of the subtractor ST2 that changes with the shifting of the enlarging lens L, with the output data X from the second calculation circuit CL2, and shifts the enlarging lens L through the motor M in a direction such that the value ΔA coincides with the value X.

The manner of the operation of the above construction will now be explained. At the outset, data-up key K5 and the data-down key K6 may be operated until the indication of indicating device F1 coincides with the value of the focal length of the enlarging lens L being used. Then, after the light source head H has been set to an arbitrary position, the selector switch SW may be connected to the power focus terminal PF and the enlarging lens L may be shifted upwards or downwards to adjust the focusing with the lens-up key K3 and lens-down key K4 being appropriately operated. At this time, the up/down counter UD1 is set in accordance with the amount and direction of the shifting of the light source head H, and up/down counter UD2 is set in accordance with the amount and direction of the rotation of the motor M.

When the key K1 is depressed, the latch circuit LT1 holds the output data d of the up/down counter UD1 at the time of the key depression and produces the held data as the data $d_o$. The latch circuit LT2 holds the output data a of the up/down counter UD2 at the time of the key depression and produces the held data as the data $a_o$.

Then, when the light source head H is shifted, the up/down counter UD1 is set in accordance with the amount and direction of the shifting of the head. The subtractor circuit ST1 calculates the difference between the output $d_o$ of the latch circuit LT1 and the output d of the up/down counter UD1 and outputs the data of $\Delta D = D_o - d$. Accordingly, the data $\Delta D$ represents the amount of shifting of the light source head H from the time when the key K1 was depressed. Then, the light source head H is shifted by an arbitrary amount and the focusing is adjusted by means of the lens-up key K3 and the lens-down key K4. As a result, the up/down counter UD2 is set in accordance with the amount and direction of the rotation of the motor M. The subtractor ST2 calculates the difference between the output data $a_o$ of the latch circuit LT2 and the output data a of the up/down counter UD2 and generates an output representative of $\Delta A = a_o - a$. The data $\Delta A$ represents the amount of shifting of enlarging lens from the time when the key K1 was depressed.

Subsequently, when the key K2 is depressed, the latch circuit LT3 holds the output data $\Delta D$ of the subtractor ST1 at the time of the key depression and outputs the held data as the data $\Delta Do$. On the other hand, the latch circuit LT4 holds the output data $\Delta A$ of the subtractor ST2 at the time of the key depression and outputs the held data as the data $\Delta Ao$. The first calculating circuit CL1 receives the data $\Delta Ao$, $\Delta Do$ and f and resolves the simultaneous equation (1) and (2) to obtain the values of Ao and Bo for output.

When the selector switch SW is switched to the automatic focus terminal AF, the lens-up key K3 and the lens-down key K4 are both made in-operative and the motor M is driven by the signals M1 and M2 from the motor driving circuit MC. When the light source head H is moved thereafter, the up/down counter UD1 is set in accordance with the amount and direction of the shifting of the head and the subtractor ST1 generates the data $\Delta D$ for the amount of the shifting of the head from the time when the key K1 was depressed. The second calculating circuit CL2 receives the data Ao, Bo, f and $\Delta D$ and calculates the equation (3) to obtain the value X that represents the amount of shifting of the lens from the time when the key K1 was depressed. The output data X is signalled from the second calculating circuit CL2.

The motor control circuit MC receives the data $\Delta A$ and X. When $X > \Delta A$, the motor control circuit MC renders the signal at line M1 a logic "0" and the signal at line M2 a logic "1" to drive the motor M in the direction that shifts the enlarging lens downward. When $X < \Delta A$, the motor control circuit MC generates a logic "1" signal at line M1 and a logic "0" signal at line M2 to drive the motor M in the direction that shifts the enlarging lens upward. When $X = \Delta A$, the motor control circuit MC generates logic "0" signals at both lines M1 and M2 to stop the rotation of the motor M. When the motor is driven, the up/down counter UD2 is set in accordance with the amount and the direction of the rotation of the motor M and the subtractor ST2 outputs data on the amount of lens shifting from the time when the key K1 was depressed. As a result, the motor control circuit MC controls the motor to attain $\Delta A = X$ and brings the enlarging lens L into an in-focus position.

If the lens L is not focused at the time of stoppage of the motor, this is because the data f of the focal length set in the up/down counter UD3 is different from the actual focal length of the enlarging lens L. (The indicated focal lengths of lenses are sometimes a little different from their actual focal lengths.) In that case, the data f should be reset with the data-up key K5 and the data-down key K6 being operated. Then, the first calculation circuit CL1 calculates again the values of the new Ao and Bo from the value of the newly set f and the second calculating circuit CL2 obtains the value of X from the new values of Ao and Bo. The motor control circuit MC operates to attain $\Delta A = X$ for the new X. Thus, the value of f that can present the best focus will be sought. Accordingly, the actual value of f should not be exactly known previously.

The second calculating circuit CL2 signals the data of $(Ao + X)$ and $(Bo + \Delta D - X)$ in addition to the data X. A third calculating circuit CL3 receives the additional data from the second calculating circuit CL2 and calculates the value $\beta$ of enlarging magnification with the data $\beta$ being signalled therefrom. A magnification indicating circuit (MI) receives the data $\beta$ and indicates the value of magnification.

It should be understood that the present invention is not limited to the above embodiment but may be modified in various ways. For example, the amount, $\Delta D$, of the shifting of the light source head may be measured from the second position of the head in place of the initial position. In this case, the contents of the latch circuits LT1 and LT2 are rewritten, in response to the operation of the key K2, to the output data of the up/down counter DD1 at the time of the key K2 being operated. The amount of shifting of the light source head H may be detected by a known optical means instead of the magnetic means.

According to the present invention as described above, the light source head H is set to arbitrary first and second positions where the focusing is adjusted, then the differences of the respective positions of the light source head and the enlarging lens at their first and second positions is calculated. From the data of the differences, the amount of shifting of the enlarging lens relative to a desired position of the light source head is obtained to drive the enlarging lens in accordance with the obtained data to its in-focus position. Consequently, the invention requires no limitation of the initial value of the distance between the light source head H and the plane of the printing paper so that the automatic focusing can be effected even in the case where the easel is removed.

What is claimed is:

1. An automatic focusing device for an enlarger including a light source head and a supporting pole which supports said light source head movable along it, said light source head having a light source, a film carrier for carrying a film to be printed, and an enlarging lens movable relative to said light source head, comprising;

means for setting a focal length of said enlarging lens to produce a focal length signal representative thereof:

means for detecting a head shifting distance between first and second positions of said light source head along said pole to produce a head shifting signal representative of said head shifting distance, said first and second positions of said light source head being different from each other for detaining two different enlarging magnifications;

means for detecting a lens shifting distance between first and second in-focus positions of said enlarging lens relative to said light source head, to produce a lens shifting signal representative of said lens shifting distance, said first and second in-focus positions being determined to obtain in-focus conditions on a predetermined plane on which printing paper would be placed when said light source head is positioned on said first and second positions respectively;

means for detecting a third position of said light source head where the focusing of said enlarging lens is required, to produce a head position signal relating to said third position;

means for calculating an in-focus position of said enlarging lens relative to said light source head based on said focal length signal, said head shifting signal said head position signal and said lens shifting signal to produce a calculating signal relating to said in-focus position when said light source head is located on said third position; and, means for driving said enlarging lens in accordance with said calculating signal to bring said enlarging lens into said in-focus position.

2. An automatic focusing device as claimed in claim 1, wherein said head shifting distance detecting means includes means for detecting a position of said light source head along said pole to produce a head position signal representative thereof, means for memorizing said head position signal when said light source head is located on said first position, means for comparing said head position signal from said head position detecting means with said memorized head position signal to produce a compared signal which represents the difference between said two head position signals compared with each other, and means for memorizing said compared signal when said light source head is located on said second position.

3. An automatic focusing device as claimed in claim 2, wherein said third position detecting means includes means for memorizing said head position signal when said light source head is located on said third position.

4. An automatic focusing device as claimed in claim 1, wherein said lens shifting distance detecting means includes means for detecting a relative position of said enlarging lens to said light source head to produce a lens position signal representative of said relative position, means for memorizing said lens position signal when said enlarging lens is located on said first in-focus position, means for comparing said lens position signal from said relative position detecting means with said memorized lens position signal to produce a difference signal representative of the difference between said two lens position signals compared with each other, and means for memorizing said difference signal when said enlarging lens is located on said second in-focus position.

5. An automatic focusing device as claimed in claim 1, further comprising means for calculating an enlarging magnification in accordance with said third position of said light source head based on said focal length signal, said head shifting signal, said head position signal, and said lens shifting signal to produce a magnification signal, and means for indicating said enlarging magnification in accordance with said magnification signal.

6. An improved enlarger for producing prints from an image bearing negative comprising:
   a light source;
   a film carrier;
   an enlarging lens;
   means for supporting the light source, film carrier and enlarging lens in operative positions for different print magnifications;
   means for producing a focal length signal representative of the focal length of the enlarging lens;
   first means for focusing the enlarging lens to a first magnification position and producing and retaining first signals representative of that position;
   second means for focusing the enlarging lens to a second magnification position and producing and retaining second signals representative of that position;
   means for moving the film carrier to a final magnification position and producing a signal representative of the amount of movement of the film carrier, and
   means for automatically adjusting the position of the enlarging lens to the final focus position from the focal length signal, first signals, second signals and movement signal.

7. The invention of claim 6 wherein the means for automatically adjusting the position of the enlarging lens includes a microprocessor circuit for processing the signals and producing an output signal and a motor for moving the enlarging lens in response to the output signal.

8. In an improved enlarger for producing prints from an image bearing negative having a light source, a film carrier, an enlarging lens and means for supporting the light source, carrier and lens in operative positions for different print magnifications, the improvement comprising:
   means for producing a focal length signal representative of the focal length of the enlarging lens;
   first means for focusing the enlarging lens at a first datum position and producing and retaining first signals representative of that position;
   second means for focusing the enlarging lens at a second datum position and producing and retaining second signals representative of that position;
   means for moving the film carrier to a desired magnification position and producing a signal representative of the amount of movement of the film carrier, and
   means for automatically adjusting the position of the enlarging lens to the desired focus position from the focal length signal, first signals, second signals and movement signal including a microprocessor circuit for processing the signals and producing an output signal and a motor for moving the enlarging lens in response to the output signal.

* * * * *